(12) United States Patent
Kawato et al.

(10) Patent No.: US 12,547,821 B2
(45) Date of Patent: Feb. 10, 2026

(54) DOCUMENT PROCESSING METHOD, AND INFORMATION PROCESSING DEVICE

(71) Applicant: LEGALON TECHNOLOGIES, INC., Tokyo (JP)

(72) Inventors: Takashi Kawato, Tokyo (JP); Ruka Funaki, Tokyo (JP)

(73) Assignee: LegalOn Technologies, Inc., Tokyo (JP)

( * ) Notice: Subject to any disclaimer, the term of this patent is extended or adjusted under 35 U.S.C. 154(b) by 138 days.

(21) Appl. No.: 18/113,268

(22) Filed: Feb. 23, 2023

(65) Prior Publication Data

US 2023/0196002 A1 Jun. 22, 2023

Related U.S. Application Data

(63) Continuation of application No. PCT/JP2020/032792, filed on Aug. 29, 2020.

(51) Int. Cl.
*G06F 40/166* (2020.01)
*G06Q 50/18* (2012.01)

(52) U.S. Cl.
CPC .......... *G06F 40/166* (2020.01); *G06Q 50/18* (2013.01)

(58) Field of Classification Search
CPC ... G06F 40/10–197; G06F 40/166–186; G06F 3/048; G06Q 50/18–188; G06Q 10/10; G06Q 10/101
See application file for complete search history.

(56) References Cited

U.S. PATENT DOCUMENTS

| | | | | |
|---|---|---|---|---|
| 2011/0283177 A1* | 11/2011 | Gates | ...................... | G06Q 10/10 715/224 |
| 2015/0178867 A1* | 6/2015 | Gidney | .................. | G06Q 50/18 705/311 |
| 2017/0199657 A1* | 7/2017 | Mullins | ................. | G06F 3/0482 |
| 2018/0165261 A1* | 6/2018 | Hill | ........................ | G06F 40/131 |

(Continued)

FOREIGN PATENT DOCUMENTS

| | | |
|---|---|---|
| JP | 2002-123764 A | 4/2002 |
| JP | 2002-203186 A | 7/2002 |
| JP | 2010-092227 A | 4/2010 |

OTHER PUBLICATIONS

Sannier, Nicolas, et al. "An automated framework for detection and resolution of cross references in legal texts." Requirements Engineering 22 (2017): 215-237. (Year: 2017).*

(Continued)

*Primary Examiner* — Liang Y Li
(74) *Attorney, Agent, or Firm* — Sterne, Kessler, Goldstein & Fox P.L.L.C.

(57) ABSTRACT

A document processing method comprising: acquiring original document information associated with modified document information that includes an indication of modification including at least one of addition, replacement, and deletion; and displaying the original document information and the modified document information such that a portion of the original document information indicated by the modified document information is associated with a content to be modified indicated by the modified document information, wherein the document is a legal document, wherein the modified document information includes a content to be modified of the document information after an agreement.

13 Claims, 7 Drawing Sheets

(56) References Cited

U.S. PATENT DOCUMENTS

2018/0260378 A1* 9/2018 Theodore ................ G06F 16/93
2020/0184586 A1* 6/2020 Ervin ..................... G06Q 50/18
2020/0394612 A1* 12/2020 Khokhar ............... G06F 40/186

OTHER PUBLICATIONS

International Search Report directed to related International Patent Application No. PCT/JP2020/032792, mailed Nov. 24, 2020, with attached English-language translation; 4 pages.

* cited by examiner

| ORIGINAL CONTRACT | MODIFICATION NOTE 1 | MODIFICATION NOTE 2 | |
|---|---|---|---|
| "Agreement for Introducing Marshall"<br>Legal Force, Inc./A Company<br>Conclusion Date: July 1, 2019 | "Modification Note"<br>Legal Force, Inc./A Company<br>Conclusion Date: July 12, 2020 | "Modification Note"<br>Legal Force, Inc./A Company<br>Conclusion Date: December 5, 2020 | ... |
| "Service Agreement"<br>B Company/Taro YAMADA<br>Conclusion Date: May 6, 2017 | "Modified Contract"<br>B Company/Taro YAMADA<br>Conclusion Date: January 10, 2019 | "Modified Contract"<br>B Company/Taro YAMADA<br>Conclusion Date: May 5, 2020 | ... |
| ... | ... | ... | ... |

Article 7 (Restricted Access)

Doc 2 Modification Note

Article 5
(1) The provisions of Article 7, Paragraph 2 of the Regulations are changed as follows.
"The Contractor shall allow only the executive officers or employees of the Contractor (who are persons engaged in their work regardless of their employment pattern, such as an employment contract, an entrustment contract, or a service medication contract, and hereinafter shall be referred to as the "Officers and Employees" and the Officers and Employees of Sumitomo Chemical Systems Service Co. Ltd. to use Marshall and shall not allow other third parties to use Marshall."

Doc 1 Agreement for Introducing Marshall

Article 7 (Restricted Access)
1. Marshall is provided for use in the work of the Contractor (including the use in a law firm or a legal professional corporation in handling the legal work requested by a client), and thus, content provided to users by Marshall shall not be sold to third parties or shall not be used for other commercial purposes.
2. The Contractor shall allow only the executive officers or employees of the Contractor to use Marshall and shall not allow other third parties to use Marshall.
3. The Contractor shall disseminate the conditions stipulated in the Regulations to the users, and make them comply with the conditions.

Article 7 (Restricted Access)
1. Marshall is provided for use in the work of the Contractor (including the use in a law firm or a legal professional corporation in handling the legal work requested by a client), and thus, content provided to users by Marshall shall not be sold to third parties or shall not be used for other commercial purposes.
2. The Contractor shall allow only the executive officers or employees of the Contractor (who are persons engaged in their work regardless of their employment pattern, such as an employment contract, an entrustment contract, or a service medication contract, and hereinafter shall be referred to as the "Officers and Employees") and the Officers and Employees of Sumitomo Chemical Systems Service Co. Ltd. to use Marshall and shall not allow other third parties to use Marshall.
3. The Contractor shall disseminate the conditions stipulated in the Regulations to the users, and make them comply with the conditions.

DOCUMENT PROCESSING METHOD, AND INFORMATION PROCESSING DEVICE

CROSS-REFERENCE TO RELATED APPLICATION

The present application is a bypass continuation application based on and claims the benefit of priority from PCT Application No. PCT/JP2020/032792 filed Aug. 29, 2020, the entire contents of which are incorporated herein by reference.

TECHNICAL FIELD

The present disclosure relates to a document processing method, and an information processing device.

BACKGROUND

As a conventional technique, an information processing device has been proposed that creates a contract based on the agreed terms and conditions (for example, see Japanese Patent Application Laid-Open No. 2002-203186).

The information processing device disclosed in Japanese Patent Application Laid-Open No. 2002-203186 creates the original version of a contract based on items of the contract input by a client, and transmits the created original version to another client via a center, and then creates a consensus document by, if a reply returned from the other client via the center contains modified information, reflecting the modified information in the original version, or, if the returned reply indicates that the other client has agreed to the original version, merging the returned reply with the original version, and further transmits the consensus document to the client via the center and thus requests the client to print out the consensus document.

SUMMARY

An aspect of the invention according to the present disclosure is a document processing method comprising: acquiring original document information associated with modified document information that includes an indication of modification including at least one of addition, replacement, and deletion; and displaying the original document information and the modified document information such that a portion of the original document information indicated by the modified document information is associated with a content to be modified indicated by the modified document information, wherein the document is a legal document, wherein the modified document information includes a content to be modified of the document information after an agreement.

BRIEF DESCRIPTION OF DRAWINGS

FIG. 6 is a schematic view for illustrating an operation of reflecting a modification.

DESCRIPTION

Although the information processing device disclosed in Japanese Patent Application Laid-Open No. 2002-203186 creates a consensus document by merging the original version with the modified information before an agreement is reached, the information processing device may not reflect a modification note for modifying the content of the contract after an agreement is reached since the modification note contains information different from the modified information received before the agreement is reached and thus does not directly indicate the modification position, which may be problematic.

In view of the foregoing conventional technique, an object of the present disclosure is to provide a document processing program, an information processing device, and a document processing method that are easier to use.

According to various embodiments of the present disclosure, a document processing program, an information processing device, and a document processing method that are easier to use can be provided.

Embodiment (Configuration of Document Processing System)

Figure 1:
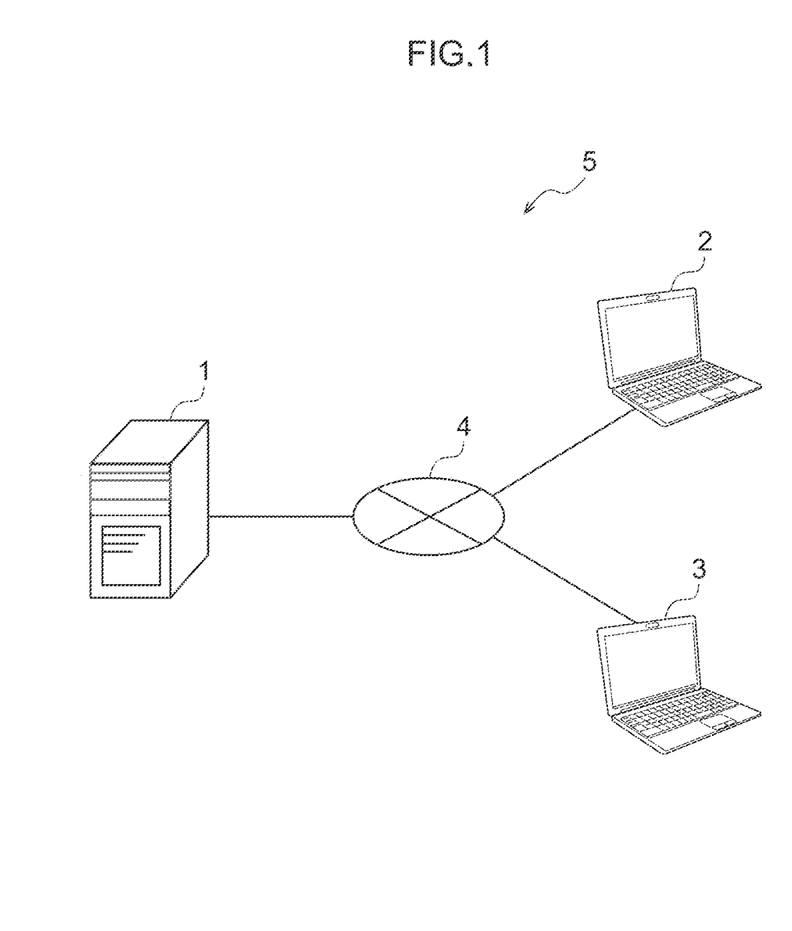
FIG. 1 is a schematic view illustrating an exemplary configuration of a document processing system according to an embodiment.

FIG. 1 is a schematic view illustrating an exemplary configuration of a document processing system according to an embodiment.

A document processing system 5 according to this embodiment includes a document processing server device 1, a terminal 2, and a terminal 3 that are connected via a network 4 in a communicable manner. The terminal 2 may be operated by a user who wants to manage, create, check, and/or review a document, for example, and the terminal 3 may be operated by another user. The user of the terminal 2 and the user of the terminal 3 may handle a contract as document information, for example, and may check the content of the contract. The document processing system 5 may be mainly used to manage document information created by one or both of the users, and also manage the document information after an agreement is reached thereon by the two users, and may further check and grasp, if the content of the document information has been modified, the content of the document information reflecting the modification.

The document processing server device 1 may be a server-type information processing device that operates in response to requests from the terminal 2 and the terminal 3, and may include electronic components, such as a CPU (Central Processing Unit) with a function of processing information, an HDD (Hard Disk Drive), and a flash memory, within the body of the document processing server device 1. The document processing server device 1 may be a single information processing device, and may be a plurality of information processing devices that operate in a cooperative manner, or may be an information processing device operated through a given cloud service. Alternatively, the function of the document processing server device 1 may be implemented within the terminal 2 and/or the terminal 3.

Each of the terminal 2 and the terminal 3 may be an information processing device, such as a PC (Personal Computer) or a tablet terminal, and may include electronic components, such as a CPU with a function of processing information and a flash memory, within the body of the terminal.

The network 4 may be a communication network that allows for high-speed communication, and may be a wired communication network, such as the Internet, intranet, or LAN (Local Area Network), or a wireless communication network, for example.

For example, a document to be processed by the document processing server device 1 may be a document in the legal field, such as a contract, and one or both of the users may be a person who is not a legal expert but needs to create a contract, or a person who is a legal expert, such as a lawyer, and has the knowledge of creating contracts. Alternatively, one or both of the users may be a staff member of a sales department in a company or a staff member of a legal department in a company, for example.

The basic operation may be as follows. First, the terminal 2 or the terminal 3 may upload document information to the document processing server device 1 so that the document information may be managed in the document processing server device 1. Then, the terminal 2 or the terminal 3 may access the document processing server device 1 to check the content of the document information, for example. In such a case, to reduce the burden of the checking operation of the user or to assist the user in creating a contract, the document processing server device 1 may associate the document information with modified document information that includes an indication of modification to the document information (i.e., a modification note or a modified contract), and then may reflect the modification in the document information so as to assist in grasping the content of the document information reflecting the modification. At that time the document processing server device 1 may display the document information in a format so as to assist in grasping the content of the document information reflecting the modification. Specific examples of the display method will be described later. Examples of the indication of modification include an indication of a target portion to be modified, and an indication of addition of new text, or replacement or deletion of text regarding the target portion to be modified. In the following, provisions of a contract may be referred to as "articles." Embodiments will be described hereinafter.

Although one terminal 2 and one terminal 3 are illustrated in the drawing, more than one terminal 2 and more than one terminal 3 may be connected to the network 4. Similarly, more than one user may operate each of such terminals.

(Configuration of Document Processing Server Device)

Figure 2:
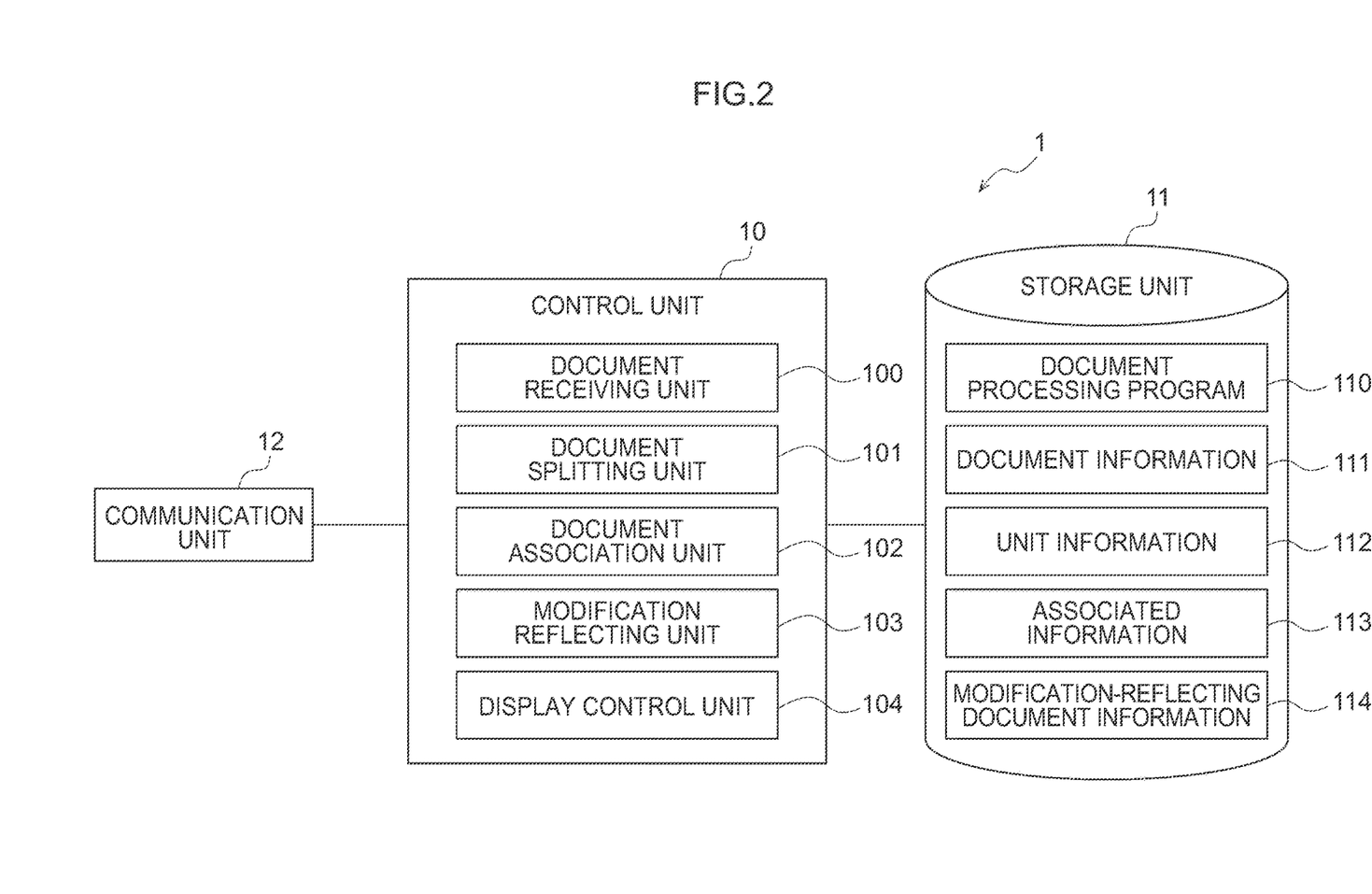
FIG. 2 is a block diagram illustrating an exemplary configuration of a document processing server device according to an embodiment.

FIG. 2 is a block diagram illustrating an exemplary configuration of the document processing server device 1 according to an embodiment.

The document processing server device 1 may include a control unit 10, which includes a CPU and the like, and may control each unit and may also execute various programs; a storage unit 11, which includes a storage medium, such as a flash memory, and stores information; and a communication unit 12 functioning as a communication interface for communicating with the outside via the network 4.

The control unit 10 may include a processor, such as a CPU, and may be electrically connected to the storage unit 11 including the memory and to the communication unit 12 functioning as the communication interface. The control unit 10 may function as a document receiving unit 100, a document splitting unit 101, a document association unit 102, a modification reflecting unit 103, a display control unit 104, and the like by executing a document processing program 110 described below.

The document receiving unit 100 may receive a contract as the document information 111, for example, from the terminal 2 or the terminal 3, and then stores the contract in the storage unit 11. The document information 111 may be image information, such as a PDF including sentences that are laid out, a text file including text data, or information, such as a word file. If the document information 111 is information other than text, the document receiving unit 100 may perform OCR (Optical Character Recognition), for example, to convert the information into text.

The document splitting unit 101 may split the document information 111 into individual components, such as a title, a preface, and article units, of a contract, and then may store the resulting information as unit information 112 in the storage unit 11. Each article unit obtained through splitting may be an article, and may be a paragraph or a sub-paragraph, or a group of a plurality of articles, paragraphs, or sub-paragraphs that has a certain meaning. Alternatively, each article unit may be a group of paragraphs or sub-paragraphs that has a certain meaning across different articles or paragraphs.

When the document information 111 is a contract, the document association unit 102 may associate the contract, which has been agreed, with a document created after the agreement of the contract and including an indication of modification to the agreed contract, such as a modification note for modifying the content of the agreed contract or a modified contract, and then may store the resulting information as associated information 113 in the storage unit 11.

The modification reflecting unit 103 may reflect the modification of the document, which includes a content to be modified, in the agreed contract among the document information 111, and then may store the resulting information as modification-reflecting document information 114 in the storage unit 11.

The display control unit 104 may display the document information 111, the unit information 112, the associated information 113, and the modification-reflecting document information 114 in the storage unit 11 as well as the output result of each of the units 100 to 103 on the display units of the terminal 2 and the terminal 3 in a controlled manner, using a predetermined method. The display method will be described in detail later.

The storage unit 11 may include a memory, such as a flash memory, and may be electrically connected to the control unit 10 including the processor and the like and to the communication unit 12 functioning as the communication interface. The storage unit 11 may store the document processing program 110, which allows the control unit 10 to operate as each of the foregoing units 100 to 104, the document information 111, the unit information 112, the associated information 113, the modification-reflecting document information 114, and the like.

Figure 3:
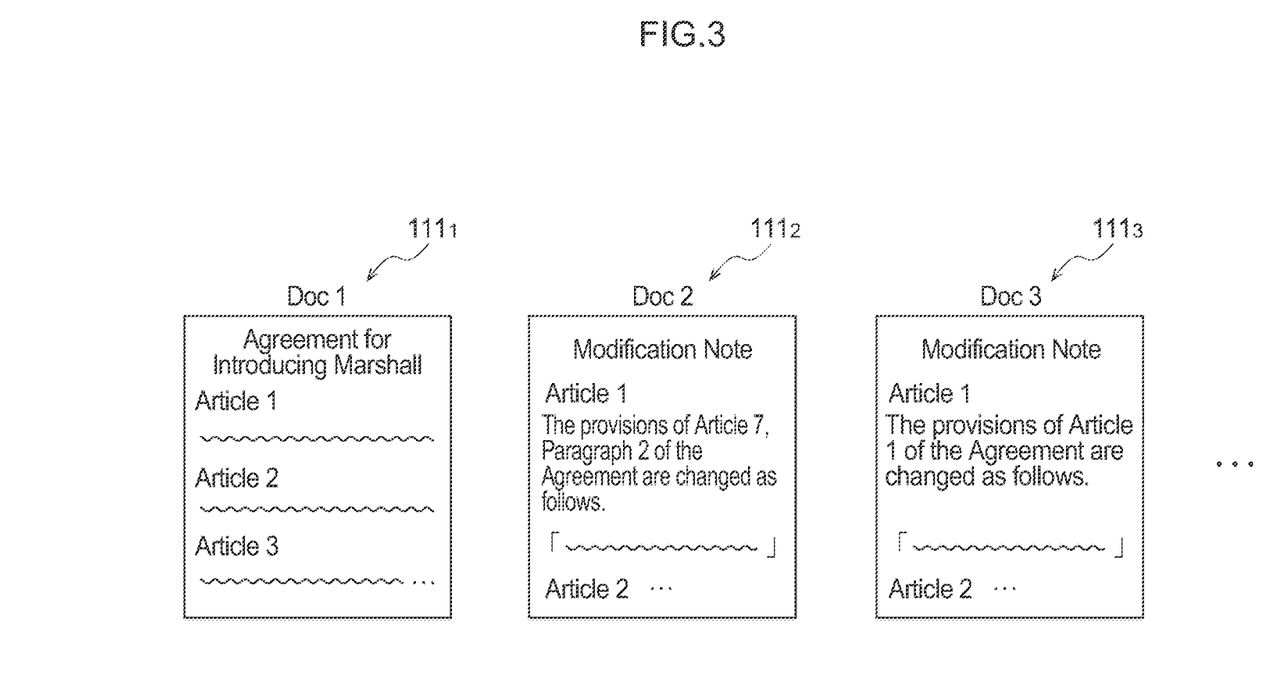
FIG. 3 is a schematic view illustrating an exemplary structure of document information.

FIG. 3 is a schematic view illustrating an exemplary structure of the document information 111.

Document information $111_1$ (Doc1) may be a contract, for example, and may include a content agreed between two parties concerned. Modified document information $111_2$ (Doc2) may be a modification note or a modified contract, for example, that defines a content to be modified of the document information $111_1$ (Doc1). Modified document information $111_3$ (Doc3) may be a modification note or a modified contract, for example, that defines a content to be further modified of the document information $111_1$ (Doc1) that has been modified based on the modified document information $111_2$ (Doc2).

Figure 4:
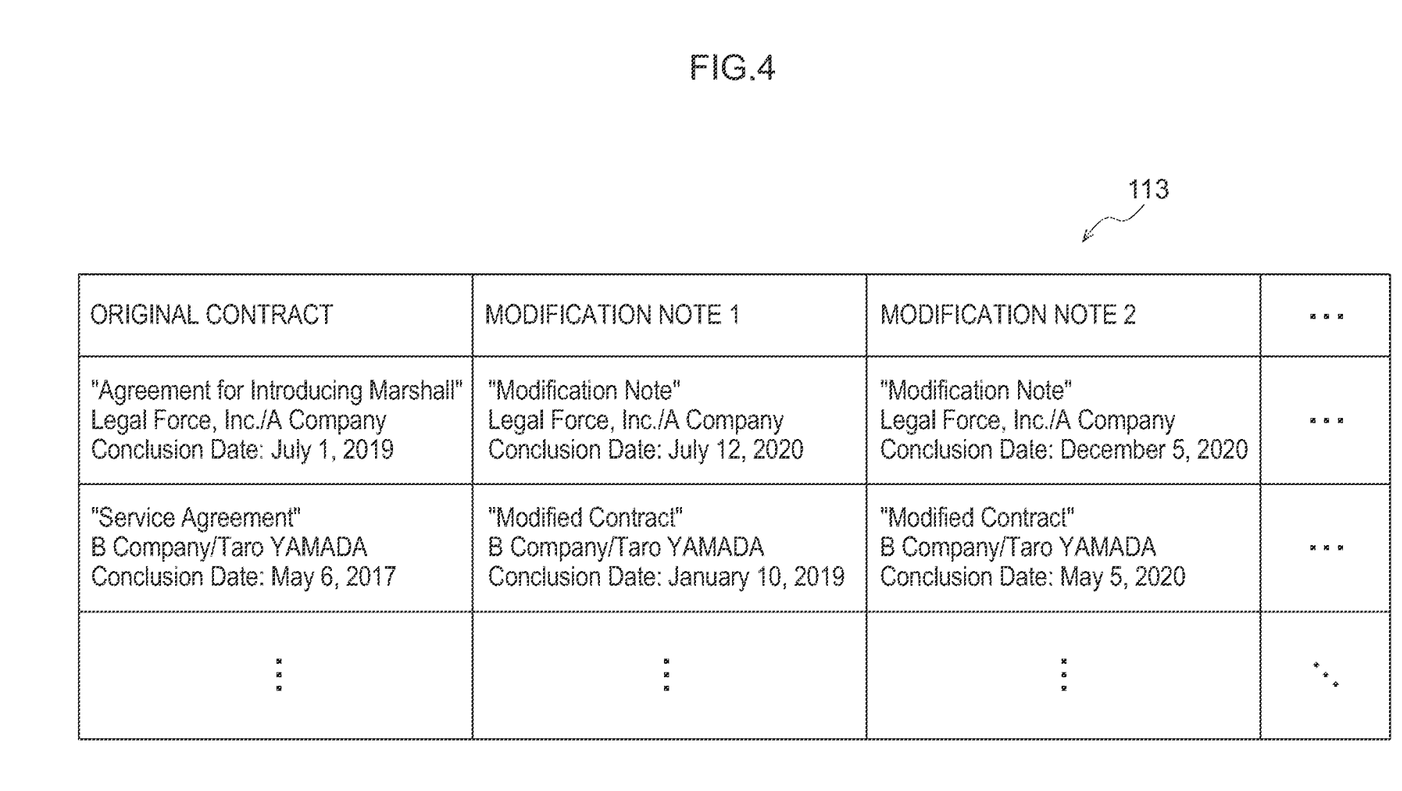
FIG. 4 is a schematic view illustrating an exemplary structure of associated information.

FIG. 4 is a schematic view illustrating an exemplary structure of the associated information 113.

The associated information 113 may be information representing the relationship among the associated pieces of document information, and may include the original contract corresponding to the document information $111_1$ (Doc1) in FIG. 3, a modification note 1 corresponding to the modified document information $111_2$ (Doc2), and a modification note 2 corresponding to the modified document information $111_3$ (Doc3).

(Operation of Document Processing System)

Next, operations in the embodiment, which may include (1) a basic operation, (2) an operation of associating documents with each other, and (3) an operation of reflecting a modification, will be individually described. Hereinafter, an operation performed with the terminal 2 will be described, and if a similar operation is performed when the terminal 2 is replaced with the terminal 3, the description of such operation will be omitted.

(1) Basic Operation

First, a user may operate the terminal 2 to log into a service provided by the document processing server device 1. The terminal 2, upon receiving an input of information, such as a user ID and a password, from the user, may send to the document processing server device 1 the information as well as an authentication request.

The document processing server device 1, upon receiving the information, such as the user ID and the password, as well as the authentication request from the terminal 2, may refer to user information including user IDs and passwords registered in advance so as to authenticate the requester as the user.

Next, the user, upon logging into the service, may operate the terminal 2 to upload document information as well as modified document information of a contract to the document processing server device 1. Then, the terminal 2 may upload the document information to the document processing server device 1.

(2) Operation of Associating Documents with Each Other

Figure 7:
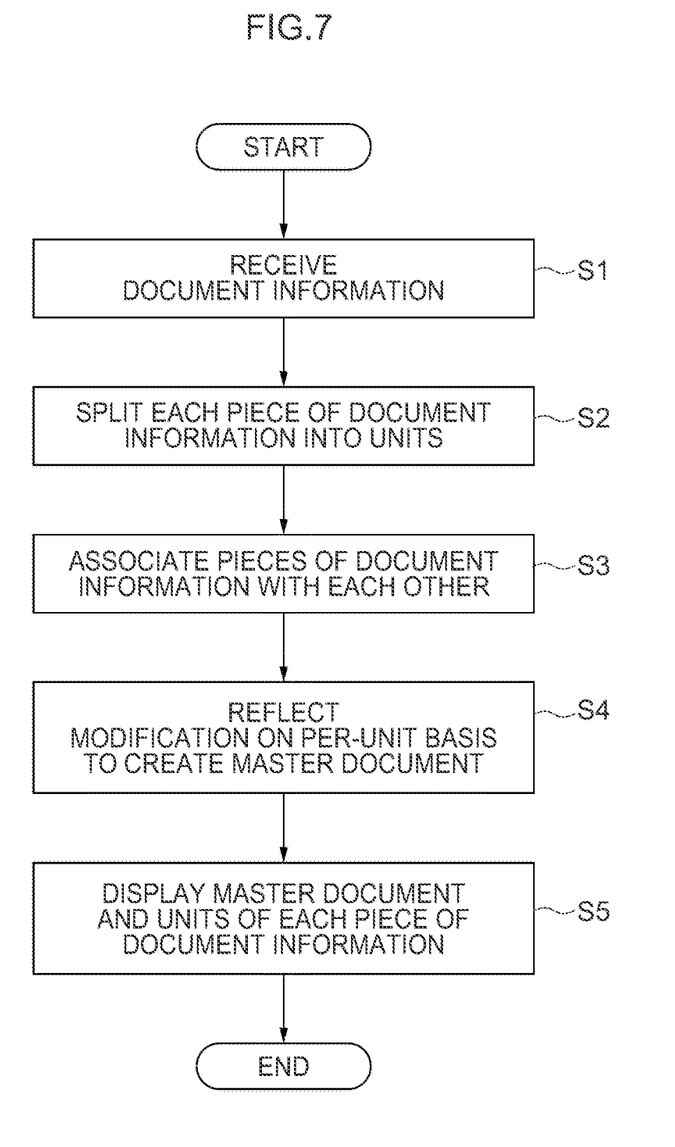
FIG. 7 is a flowchart illustrating an exemplary operation of the document processing server device.

FIG. 7 is a flowchart illustrating an exemplary operation of the document processing server device 1.

The document receiving unit 100 of the document processing server device 1 may receive the document information 111 corresponding to the original version of a contract or a modification note from the terminal 2 operated by a user, and then may store the document information 111 in the storage unit 11 (S1).

Next, the document splitting unit 101 of the document processing server device 1 may structuralize the document information 111 by splitting it into individual components of the contract, thereby obtaining pieces of unit information 112 (S2). The document information 111 may be image information, such as a PDF (Portable Document Format) file, obtained by scanning the original text of a contract or a modification note. The document splitting unit 101 may first convert the document information 111 into text using an OCR (Optical Character Reader), for example. Then, the document splitting unit 101 may split the obtained text information into like a title, a preface, article units, and paragraph units . . . of the contract. The document splitting unit 101 may further split the target document information 111 into sub-paragraphs, and may obtain the unit information 112 using the unit suitable for the structure of the document information 111. The foregoing splitting may be performed using a technique, such as machine learning or regular expression.

Next, the document association unit 102 may associate the plurality of pieces of document information 111 with each other, and may store the resulting information as the associated information 113 in the storage unit 11 (S3). The operation of associating the pieces of document information 111 with each other may be performed automatically in response to a user's operation on the terminal 2 or based on information, such as the titles and the parties concerned, of the pieces of document information 111.

As a result of the associated operation of the document association unit 102, as illustrated in FIG. 3, the document information $111_1$ (Doc1), which is the original contract including a content agreed between the two parties, the modified document information $111_2$ (Doc2), which is a modification note defining a content to be modified of the document information $111_1$ (Doc1), and the modified document information $111_3$ (Doc3), which is a modification note defining a content to be further modified of the document information $111_1$ (Doc1) that has been modified based on the modified document information $111_2$ (Doc2), may be associated with each other.

The foregoing association may be recorded as the associated information 113 as illustrated in FIG. 4, and thus, the document information $111_1$ (Doc1) as the original contract, the document information $111_2$ (Doc2) as the modification note 1, and the document information $111_3$ (Doc3) as the modification note 2 may be associated with each other.

(3) Operation of Reflecting Modification

Next, the user may operate the terminal 2 to request the document processing server device 1 to allow the user to refer to the content of the desired contract reflecting the modification, and thus may select the contract.

The terminal 2 may request the document processing server device 1 to allow the user to select the original contract (or the modification note or the group of contracts associated with each other), and refer to the current content of the selected contract reflecting the modification.

The modification reflecting unit 103 of the document processing server device 1, upon receiving the request to select the contract and refer to the content of the contract, may reflect the modification in the original contract on a per-unit basis to create a master document (S4), and the display control unit 104 may display the master document together with the content of the contracts of the contract group (S5).

The foregoing screen for selection and display may be displayed on the display unit of the terminal 2 by the display control unit 104 as in FIG. 5 described below.

Figure 5:
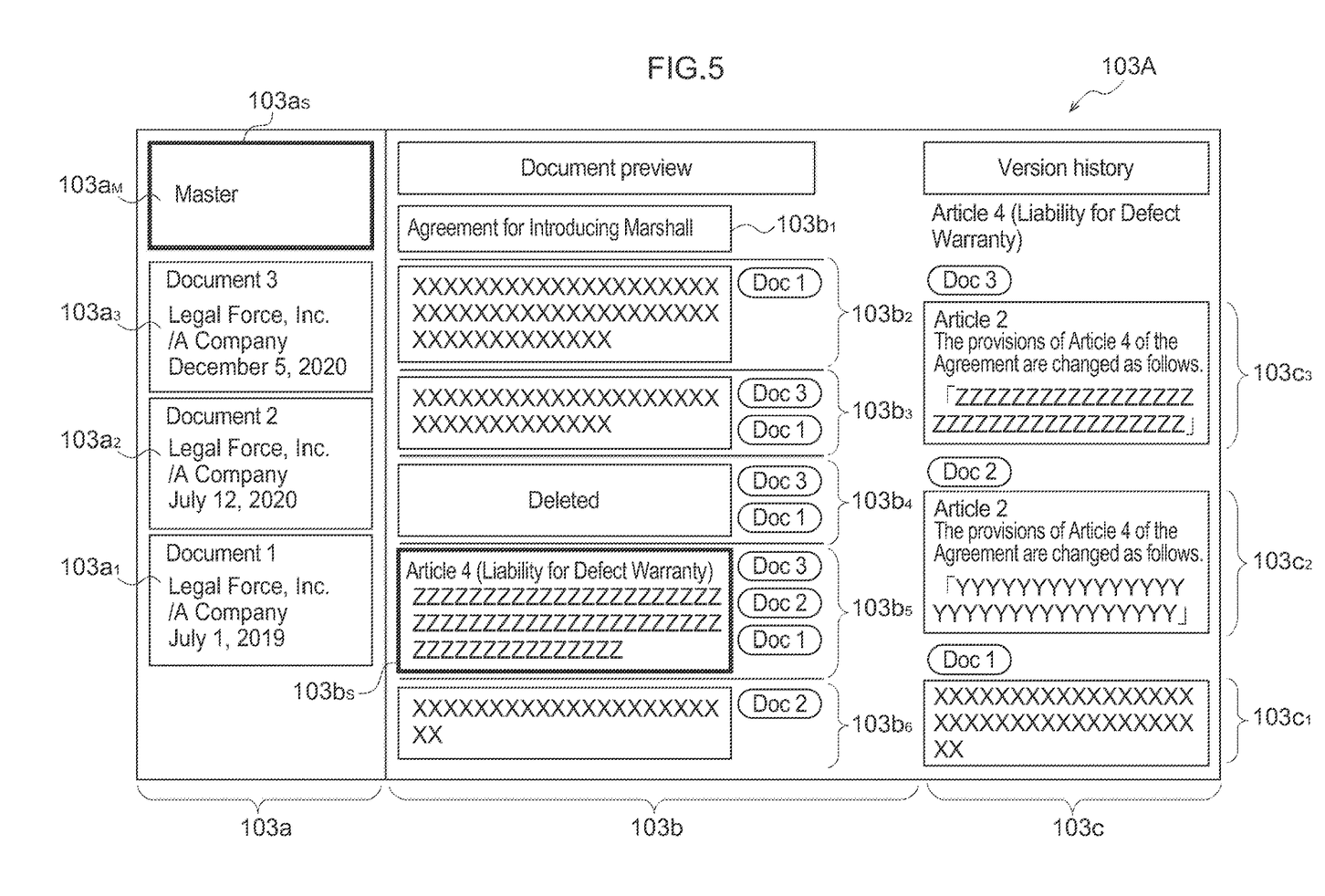
FIG. 5 is a schematic view illustrating an exemplary configuration of a screen displayed on a display unit of a terminal.

FIG. 5 is a schematic view illustrating an exemplary configuration of the screen displayed on the display unit of the terminal 2.

A screen 103A may include a display field 103a for selecting document information, a display field 103b for displaying the content of the document information selected by a selection frame $103a_S$ in the display field 103a, and a display field 103c for displaying a modification history of a unit selected by a selection frame $103b_S$ in the display field 103b.

The display field 103a may include a master document $103a_M$ for displaying the content of the master document reflecting all modifications, a document $103a_3$ for displaying the content of the modified document information $111_3$ (Doc3) as a modification note, a document $103a_2$ for displaying the content of the modified document information $111_2$ (Doc2) as a modification note, and a document $103a1$ for displaying the content of the document information $111_1$ (Doc1) as the original contract.

The display field $103b$ may display the content of each document information per unit, and includes a title $103b1$ of the contract and articles $103b_2$ to $103b_6$ . . . . The document number related to each article may be displayed to the right of the article. In the example of FIG. 5, Doc1 to Doc3 are related to Article 4 of the master document.

The display field $103c$ may include unit information $103c_1$ to $103c_3$ of the respective document information related to the article. In the example of FIG. 5, Article 4 of Doc1, Article 2 of Doc2, and Article 2 of Doc3 are related to Article 4 of the master document.

The user may refer to the foregoing screen 103A displayed on the display unit of the terminal 2, and may select the master document $103a_M$ with the selection frame $103a_S$ in the display field $103a$ to check the content of the contract reflecting the modification. In addition, the user may check the content of the contract reflecting the modification in the display field $103b$, and, for checking the modification history, may select an article with the selection frame $103b_S$ in the display field $103b$ so as to check the modification history in the display field $103c$.

The details of the operation in step S4 will be described with reference to FIG. 6.

FIG. 6 is a schematic view for illustrating an operation of reflecting a modification.

For example, regarding Article 7 $111_{17}$ of the original contract (Doc1), the modification reflecting unit 103 of the document processing server device 1 may search for other associated modified document information specifying Article 7. If Article 7, Paragraph 2 of the original contract is specified in Article 5 $111_{27}$ of the modification note (Doc2), the modification reflecting unit 103 of the document processing server device 1 may determine an article obtained by reflecting the content to be modified $111_{27}a$ of the Article 5 $111_{27}$ of the modification note (Doc2) in the Article 7 $111_{17}$ as Article 7 $111_{37}$ of the master document, and then, the display control unit 104 may display the modified portion $111_{37}a$ in a highlight color, for example. In this manner, a master document may be created by reflecting a modification in the original contract on a per-unit basis, and then, the master document may be stored as the modification-reflecting document information 114 in the storage unit 11.

The foregoing operation, regarding the Article 7 $111_{17}$ of the original contract (Doc1), for example, the modification reflecting unit 103 may search for other associated document information specifying Article 7, and if Article 7, Paragraph 2 of the original contract is specified in the Article 5 $111_{27}$ of the modification note (Doc2), the display control unit 104 may display the content to be modified $111_{27}a$ of the Article 5 $111_{27}$ of the modification note (Doc2) and the content of the Article 7 $111_{17}$, which does not reflect the modification yet, as the Article 7 $111_{37}$ of the master document in association with each other, and then may obtain confirmation from the user and may further allow the modification reflecting unit 103 to automatically reflect the content to be modified $111_{27}a$ in the Article 7 $111_{37}$ of the master document, or allow the user to reflect the content to be modified $111_{27}a$ in the Article 7 $111_{37}$ of the master document.

(Advantageous Effects of Embodiment)

According to the foregoing embodiment, original document information associated with modified document information, which includes an indication of modification, may be acquired, and a portion of the original document information indicated by the modified document information may be displayed in association with a content to be added, replaced, and/or deleted indicated by the modified document information. Thus, it is possible to easily grasp the relationship between an indication in the modified document information and a portion of the original document information corresponding to the indication.

In addition, since each of the modified document information and the original document information may be split based on a predetermined unit, and a unit of the original document information indicated by the modified document information may be presented in association with a unit to be added, replaced, and/or deleted indicated by the modified document information, it is possible to grasp the content to be modified per unit. Further, since a content to be added, replaced, and/or deleted indicated by the modified document information may be reflected in a portion of the original document information indicated by the modified document information, it is possible to easily grasp the current content of the contract.

OTHER EMBODIMENTS

The present invention is not limited to the foregoing embodiment, and can be modified in various ways within the scope of the present invention.

For example, the document information 111 may be a contract, and may be a legal document or a document in a field other than the legal field, such as an instruction manual, as long as such a document is to be modified later and such a modification is described in another document information. In addition, the individual components may be articles, paragraphs, or sub-paragraphs of a contract, words, characters, symbols, paragraphs, or sentences. Also, document information without splitting into individual components can be applicable. Further, the language of the document information 111 may be Japanese or English and any other languages that can construct a sentence from which information can be extracted.

In the foregoing embodiment, the function of each of the units 100 to 104 of the control unit 10 may be implemented by a program, but some or all of the unit may be implemented by hardware, such as an ASIC. Alternatively, the program used in the foregoing embodiment may be provided by being stored in a recording medium, such as a CD-ROM. Further, the order of the steps described in the foregoing embodiment may be changed, or one or more of the steps may be removed, or further, (an) other step(s) may be added within the scope of the present invention.

[Notes]

The disclosed embodiment further discloses the following notes.

(Note 1)

A document processing program for causing a computer to function as display control means for acquiring original document information associated with modified document information that includes an indication of modification including at least one of addition, replacement, and deletion, and displaying the original document information and the modified document information such that a portion of the original document information indicated by the modified document information is associated with a content to be modified indicated by the modified document information.

(Note 2)

The document processing program according to Note 1 above, for further causing a computer to function as splitting means for splitting each of the modified document information and the original document information based on a predetermined unit to obtain unit information, in which the display control means presents the original document information and the modified document information such that a unit of the original document information indicated by the modified document information is associated with a unit to be modified indicated by the modified document information.

(Note 3)

The document processing program according to Note 1 or 2 above, for further causing a computer to function as modification reflecting means for reflecting the content to be modified indicated by the modified document information in the portion of the original document information indicated by the modified document information.

(Note 4)

The document processing program according to any one of Notes 1 to 3 above, in which the computer is connected to one or more terminals via a network in a communicable manner.

(Note 5)

The document processing program according to any one of Notes 1 to 4 above, in which the computer is connected to one or more terminals via a wireless communication network.

(Note 6)

An information processing device including display control means for acquiring original document information associated with modified document information that includes an indication of modification including at least one of addition, replacement, and deletion, and displaying the original document information and the modified document information such that a portion of the original document information indicated by the modified document information is associated with a content to be modified indicated by the modified document information.

(Note 7)

An information processing device including a memory configured to store document information in addition to a predetermined instruction; and a processor configured to, based on the instruction stored in the memory, execute a process for acquiring original document information associated with modified document information that includes an indication of modification including at least one of addition, replacement, and deletion, and displaying the original document information and the modified document information such that a portion of the original document information indicated by the modified document information is associated with a content to be modified indicated by the modified document information.

(Note 8)

A document processing method including a step of acquiring original document information associated with modified document information that includes an indication of modification including at least one of addition, replacement, and deletion, and displaying the original document information and the modified document information such that a portion of the original document information indicated by the modified document information is associated with a content to be modified indicated by the modified document information.

The invention claimed is:

1. A computer-implemented document processing method comprising:
　　acquiring, using one or more processors, original document information associated with modified document information that includes an indication of modification including at least one of addition, replacement, and deletion;
　　storing, in a server memory device that is connected to one or more terminals via a network in a communicable manner, the acquired original document information and the modified document information, wherein each terminal includes a display device;
　　splitting, by the one or more processors, each of the modified document information and the original document information into article units to obtain unit information, wherein the splitting is performed by a machine learning model;
　　displaying, on at least one of the one or more terminals, the original document information and the modified document information such that an article unit of the original document information indicated by the modified document information is automatically visually linked and associated with an article unit to be modified indicated by the modified document information;
　　displaying a master document on a first display field of the one or more terminals using the one or more processors;
　　receiving a user selection of an article unit in the master document; and
　　in response to the selection, acquiring information of the selected article unit and displaying a plurality of article units containing document modification information of the selected article unit in a history view along with the selected article unit,
　　wherein the original document information is part of an original document created after agreement of a contract,
　　wherein the article units of the modified document information include a content to be modified of the original document information after the agreement, and
　　if the first part of the original document is specified by a second part of the modified document, displaying, on the one or more terminals, the master document in which the second part of the modified document is reflected in the first part of the original document.

2. The computer-implemented method according to claim 1, further comprising reflecting the content to be modified indicated by the modified document information in the portion of the original document information indicated by the modified document information.

3. The computer-implemented method according to claim 1, wherein:
　　the original document information is the original document; and
　　the modified document information is a modification note.

4. The computer-implemented method according to claim 1, further comprising retaining associated information that contains the original document information and the modified document information.

5. The computer-implemented method according to claim 1, further comprising displaying the master document by reflecting the modified document information in the original document.

6. The computer-implemented method according to claim 5, further comprising displaying the master document and the content of the original document information or the modified document information at the same time.

7. The computer-implemented method according to claim 1, further comprising displaying the original document information or the modified document information related to an article unit used in the master document.

8. The computer-implemented method according to claim 1, further comprising:

acquiring the information of the unit selected by a user in the master document; and displaying the article units related to the selected unit in the original document information and the modified document information.

9. The computer-implemented method according to claim 1, further comprising connecting the one or more terminals and the server memory device via a wireless communication network.

10. An information processing device for processing a document that may be modified after conclusion, comprising:

at least one processor; and a memory in communication with the at least one processor and configured to store document information in addition to a plurality of instructions, wherein the at least one processor is configured to execute the plurality of instructions thereby causing the processor to:

acquire, using at least one processor, original document information associated with modified document information that includes an indication of modification including at least one of addition, replacement, and deletion;

store, in a server memory device that that is connected to one or more terminals via a network in a communicable manner, the acquired original document information and the modified document information, wherein each terminal includes a display device;

split, by the at least one processor, each of the modified document information and the original document information into article units to obtain unit information, wherein the splitting is performed by a machine learning model;

display, on at least one or more of the one or more terminals, the original document information and the modified document information such that an article unit of the original document information indicated by the modified document information is automatically visually linked and associated with an article unit to be modified indicated by the modified document information;

display a master document of a first display field of at least one of the one or more terminals using the at least one processor;

receive a user selection of an article unit in the master document; and in response to the selection, acquire information of the selected article unit and display a plurality of article units containing document modification information of the selected article unit in a history view along with the selected article unit;

wherein the original document information is part of an original document created after agreement of a contract, wherein the article units of the modified document information include a content to be modified of the original document information after the agreement, and if the first part of the original document is specified by a second part of the modified document, displaying, on the display device, the master document in which the second part of the modified document is reflected in the first part of the original document.

11. The information processing device according to claim 10, wherein the at least one processor is further configured to display the master document by reflecting the modified document information in the original document.

12. The information processing device according to claim 10, wherein the at least one processor is further configured to display the master document and the content of the original document information or the modified document information at the same time.

13. The information processing device according to claim 10, wherein the at least one processor is further configured to display the document information or the modified document information related to a unit used in the master document.

* * * * *